(12) United States Patent
Lyon et al.

(10) Patent No.: US 9,738,450 B2
(45) Date of Patent: Aug. 22, 2017

(54) WAREHOUSE CONVEYOR

(71) Applicant: Hoj Engineering & Sales Co., Inc., Salt Lake City, UT (US)

(72) Inventors: Robert Glen Lyon, Bluffdale, UT (US); Mark Westover, Riverton, UT (US)

(73) Assignee: Hoj Engineering & Sales Co., Inc., Salt Lake City, UT (US)

( * ) Notice: Subject to any disclaimer, the term of this patent is extended or adjusted under 35 U.S.C. 154(b) by 44 days.

(21) Appl. No.: 14/242,480

(22) Filed: Apr. 1, 2014

(65) Prior Publication Data

US 2014/0291112 A1  Oct. 2, 2014

Related U.S. Application Data

(60) Provisional application No. 61/807,025, filed on Apr. 1, 2013.

(51) Int. Cl.
*B65G 1/00* (2006.01)
*B65G 1/137* (2006.01)
(52) U.S. Cl.
CPC .................. *B65G 1/1378* (2013.01)
(58) Field of Classification Search
CPC ............... B65G 1/1376; B65G 1/1378
See application file for complete search history.

(56) References Cited

U.S. PATENT DOCUMENTS

| | | | | |
|---|---|---|---|---|
| 5,636,966 A | * | 6/1997 | Lyon .................. | B65G 1/1378 414/789.6 |
| 2004/0146380 A1 | * | 7/2004 | Baker .................. | B65G 1/1373 414/273 |
| 2004/0243278 A1 | * | 12/2004 | Leishman ............ | G06Q 10/087 700/214 |
| 2014/0178161 A1 | * | 6/2014 | Moosburger ........ | B65G 1/1378 414/273 |
| 2014/0249666 A1 | * | 9/2014 | Radwallner ........... | B65G 1/137 700/216 |

FOREIGN PATENT DOCUMENTS

AT    WO 2013033743 A1  *  3/2013  ........... B65G 1/1378

OTHER PUBLICATIONS

O'Neill, J.; "It's Better Overhead"; Modern Materials Handing; May 2005; vol. 60, No. 5 p. 37.
Tinham, B.; "Which Way for Integrated Warehouse Management?"; Manufacturing Computer Solutions, 2004, vol. 10, No. 4; pp. 12-13, 15.

\* cited by examiner

*Primary Examiner* — Mark A Deuble
(74) *Attorney, Agent, or Firm* — Thorpe North & Western (57) ABSTRACT

A warehouse conveyor system can include an input conveyor path for conveying a parcel toward an inventory picking area. An input conveyor switch can divert the parcel from the input conveyor path to a predetermined pick zone for fulfillment. An output conveyor path can convey the parcel from the pick zone after fulfillment.

17 Claims, 8 Drawing Sheets

WAREHOUSE CONVEYOR

PRIORITY CLAIM

This application claims the benefit of U.S. Provisional Patent Application Ser. No. 61/807,025, filed Apr. 1, 2013, which is hereby incorporated herein by reference in its entirety.

BACKGROUND

Warehouses and warehouse systems have been developed and used by many retailers and other entities for storing items or materials for distribution to customers. A warehouse management system can be used to control the movement of materials within a warehouse and process the associated transactions, including shipping, receiving, putaway and picking Warehouse management systems can utilize barcode scanners, mobile computers, wireless LANs (Local Access Networks) and similar technologies to monitor the flow of items or materials within the warehouse. A warehouse management system can provide a set of computerized procedures to handle the receipt of stock and returns into a warehouse facility, manage the logical representation of the physical storage facilities (e.g. racking etc.), manage the stock within the facility and enable a seamless link to order processing and logistics management in order to pick, pack and ship product out of the facility.

Warehouse systems may utilize conveyors, such as those including belts, rollers, or other suitable technologies, to convey items between locations in the warehouse for storage, shipping, and other procedures. In some cases, picking zones are located adjacent to a conveyor to enable pickers (e.g., humans) to pick products and place the products in a container which then is circulated to other pick zones for additional product picking Such configurations are typically in a loop, resulting in the container being transported past the pick zones between the current zone and the destination. If there is a disruption of flow at one of the pick zones, such as due to insufficient capacity to pick the products rapidly, then work at many of the pick zones may be temporarily halted while the zone with insufficient capacity completes the backlog of pick jobs.

Belt conveyors have been used for hundreds of years, such as to move sacks of grain. In more recent times, roller conveyors have been developed. Belt, roller and other conveyor are common and use motors, gravity and the like for transporting objects. In many 'modern' distribution centers miles of conveyors snake past racks of inventory. Workers pick items and cases and place the items in totes or cartons on the conveyor (sometimes called pick and pass) or workers pick items and cases and place the items directly onto the conveyor which carries them to sortation areas where orders are consolidated. The order picking process is functionally single threaded and operated in an inflexible fixture. Order cycle-times are often long. Also, if there is a disruption of flow at one of the pick zones, such as due to insufficient capacity to pick the products rapidly, then work at all of the pick zones may be temporarily halted while the zone with insufficient capacity complete the backlog of pick jobs.

Some example types of conveyor systems include receiving induction, pick module, and complex front end conveyor systems. Receiving induction systems use a single induction conveyor and involve multiple tote touches (or human interaction) with mobile floor receiving stations. Any trash on the conveyor is manually removed and off-loading of excess empty boxes can be difficult. Pick module systems may be highly congested, confusing, having a minimal tote buffer capacity, frequent main line backups, and an inability to use side conveyors efficiently. Complex front end conveyor systems involve complex routing for floor to floor deliveries, multiple scanner and decision points, and a network of conveyors with difficult access for error recovery. Thus, many conventional conveyor systems have a number of drawbacks, leading to more human interaction, less efficiency, and more time spent completing orders.

SUMMARY

In one example of the present technology, a warehouse conveyor system can include an input conveyor path for conveying a parcel toward an inventory picking area. An input conveyor switch can divert the parcel from the input conveyor path to a predetermined pick zone for fulfillment. An output conveyor path can convey the parcel from the pick zone after fulfillment.

A warehouse fulfillment method in accordance with an example of the present technology can include conveying a parcel along an input conveyor path and diverting the parcel from the input conveyor path to a predetermined pick zone for fulfillment. The parcel can be conveyed from the pick zone after fulfillment along an output conveyor path physically separated from the input conveyor path.

A warehouse conveyor system in accordance with another example of the present technology can include an input conveyor path for conveying parcels and multiple input conveyor path switches for diverting at least one of the parcels from the input conveyor path to a predetermined pick zone for fulfillment. Multiple vertically arranged output conveyor paths at multiple elevations can convey at least one of parcels from the pick zone after fulfillment. A vertical lift can be provided between each of the input conveyor path switches and the vertically arranged output conveyor paths for vertically conveying at least one of parcels between a first elevation of the input conveyor path and a second elevation of a selected output conveyor path. A sorting module can be used to sort the parcels horizontally and vertically by causing the parcels to exit the input conveyor path using one of the input conveyor path switches and to exit the vertical lift at one of the elevations for delivery directly to the predetermined pick zone.

DETAILED DESCRIPTION

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

Definitions

As used herein, the terms "box", "tote", "container", "crate" and "parcel" may refer to a same or similar item or container commonly used in warehouse systems. The container may be empty or contain one or more contents, such as inventory items picked at a pick zone and placed in the container.

As used herein, a "conveyor" refers to mechanical handling equipment that moves materials from one location to another.

As used herein, a "conveyor path" refers to a physical pathway along which parcels or other items may be conveyed. A conveyor path includes a physical conveyance device or conveyor, such as, but not limited to, a conveyor belt, conveyor rollers, robotic device or vehicle, or any other suitable conveyance technology.

As used herein, the term "processor" refers to a device that performs a set of steps according to a program (e.g., a digital computer). Processors, for example, include Central Processing Units ("CPUs"), Graphics Processing Units ("GPUs"), electronic devices, or systems for receiving, transmitting, storing and/or manipulating digital data under programmatic control.

As used herein, "adjacent" refers to near or close sufficient to achieve a desired effect. Although direct physical contact is most common in the structures or volumes of the present invention, adjacent can broadly allow for spaced apart features.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the terms "about" and "approximately" are used to provide flexibility, such as to a numerical range endpoint by providing that a given value may be "a little above" or "a little below" the endpoint with a degree of flexibility as would be generally recognized by those skilled in the art. Further, the terms "about" and "approximately" explicitly include the exact endpoint, unless specifically stated otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Examples of the Technology

The present technology involves a warehouse conveyor system which addresses at least some of the drawbacks and inefficiencies of prior warehouse technologies. Rather than using a conventional pick and pass process, the present technology provides a direct to zone process which significantly increases efficiency and processing times of customer orders in a number of ways, as will be apparent from the present disclosure.

In one example of the present technology, a warehouse conveyor system can include an input conveyor path for conveying a parcel toward an inventory picking area. An input conveyor switch can divert the parcel from the input conveyor path to a predetermined pick zone for fulfillment. An output conveyor path that is physically separated from the input conveyor path can convey the parcel from the pick zone after fulfillment.

Figure 1A:
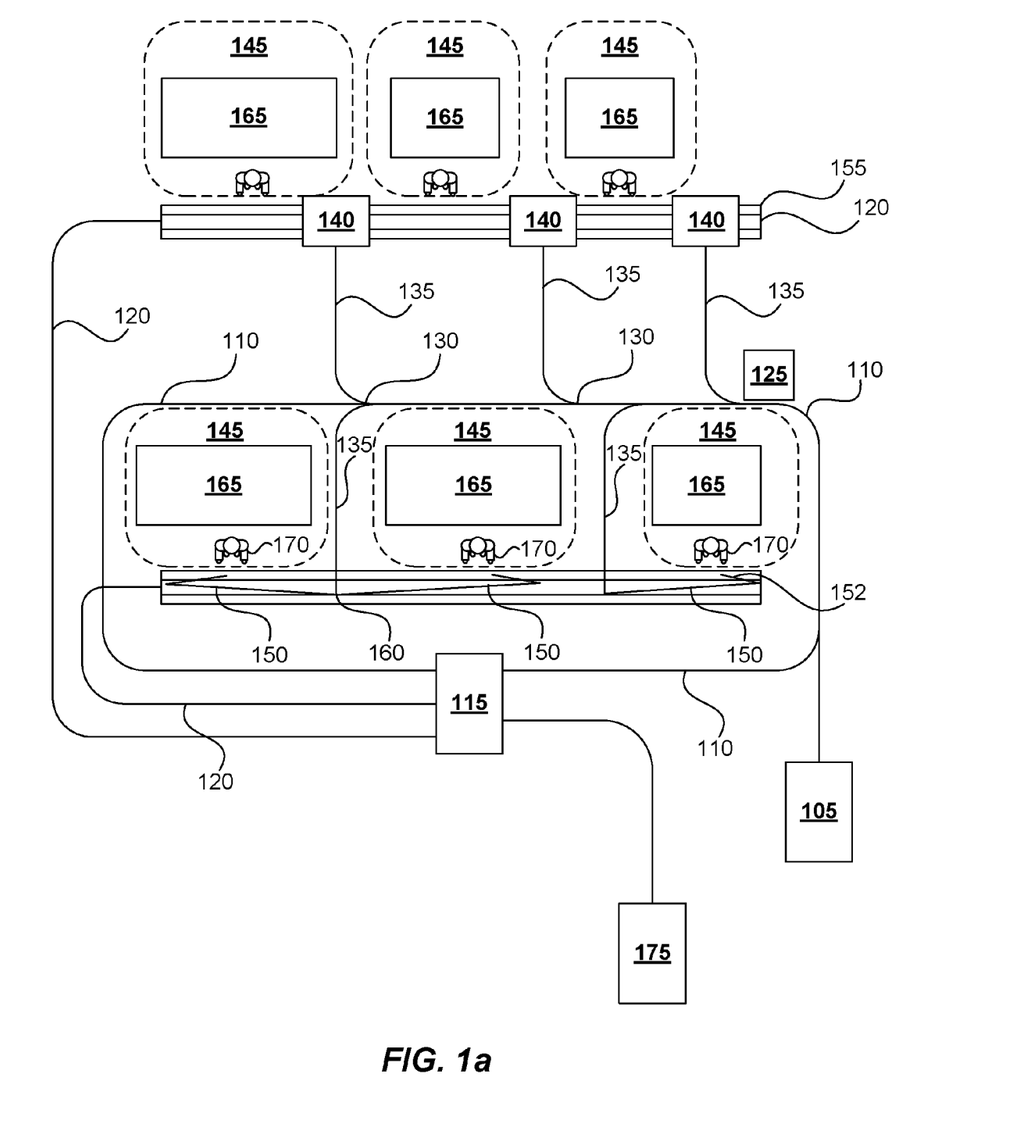
FIGS. 1a-1b are top views of an example warehouse conveyor system in accordance with the present technology.

Referring to FIG. 1a, a warehouse conveyor system is illustrated in accordance with an example of the present technology. Various aspects of the system are simplified for illustration purposes. FIG. 1a is a top view looking down on a conveyor system and a single level of pick zones 145 are visible, a conveyor system may include any desired number of levels or layers suited to a particular application, as will be apparent from the following discussion.

The warehouse conveyor system can include an input conveyor path 110. The input conveyor path can operate to "input" totes or parcels to respective pick zones, facilitating a direct to zone processing system. As shown in FIG. 1a, the input conveyor path 110 can be a substantially uninterrupted looped path for circulating parcels to a target pick zone. For example, a tote on the input conveyor path may circulate uninterrupted by individual pick zones 145 or other features of the system, at least until the tote is diverted to a pick zone, shipping zone, or other destination. In one example, if there is a backlog at the target pick zone 145, the parcel can continue circulating along the input conveyor path until the backlog of orders to be picked at the target pick zone has been reduced or cleared. If an order includes items from multiple different pick zones and one or more of the pick zones is currently experiencing a backlog of orders to be picked, the parcel can circulate to another of the pick zones for fulfillment. After fulfillment at the other pick zone(s), the parcel can re-enter the input conveyor path for delivery to the remaining pick zones. Thus, using the direct to zone model, picking can be performed in any sequence or order and is not dictated by the layout of the pick zones along the conveyor path.

The warehouse conveyor system can include an empty tote input path 105 feeding into the input conveyor path 110 to delivery empty totes or parcels into the flow for fulfillment. Empty totes provided on the empty tote input path can include a barcode, label, or other identifier for associating the empty tote with an order to be fulfilled. In one aspect, the empty totes can be transported to the pick zones 145 and a number of empty totes may be kept at the pick zones until an order is received. Once an order is received the order can be associated with the tote. As a tote or parcel proceeds on the input conveyor path 110, or at different positions along a circulation path, a sensor or scanner or other parcel identification device 125 can be used to identify the parcel to determine to which pick zone or other destination the parcel is to be directed.

After a parcel has entered the input conveyor path 110, the parcel may pass one or more exit points or input conveyor switches 130 for diverting the parcel from the input conveyor path 110 toward a predetermined pick zone 145 for fulfillment. While FIG. 1a illustrates the input conveyor switches 130 as providing a curved exit path 135 from the input conveyor path, the exit path may be linear without a curve, or may be any other suitable geometric configuration. Various conveyor switching mechanisms are known for directing a parcel to one or more different paths automatically or manually. For example, some switching technologies may be built into the path upon which the parcel is supported, such as, for example, the Activated Roller Belt™ by Intralox. Other switching technologies may include an arm or plate configured to push, pull, or otherwise force a parcel from the side in one direction or another. A manual implementation may include a human operator positioned near the switch for pushing, pulling, or otherwise causing parcels to move from the input conveyor path onto an exit path.

In practice, a warehouse conveyor system may typically include multiple exit paths 135 accessible from the input conveyor path 110 using one or more input conveyor switches 130. Where the exit paths are offset as shown to towards the right-hand side of FIG. 1a, an input conveyor switch 130 may be provided for each exit path. However, as shown towards the left-hand side of FIG. 1a, multiple exit paths may proceed from a same or similar switch 131 on the input conveyor path. In this example, a single input conveyor switch 131 may be used to direct a parcel along one of multiple different exit paths.

In one aspect, the input conveyor path 110 can avoid many of the stops, congestion, and so forth, by providing exits at intervals for individual totes to exit near a destination or target pick zone off of the input conveyor path 110. The input conveyor path of the present technology may allow for higher, same, or lower speeds than other portions or conveyor paths of the warehouse conveyor system, as will be described in greater detail below.

Where conventional systems send the parcels through each pick zone 145, the present input conveyor path 110 flow can avoid transport through the pick zones entirely, resulting in increased efficiency with direct to zone processing and a decrease in delays for overall system operation when one or more pick zones develop a backlog of orders. As will be discussed below, the input conveyor path may 110 not be entirely separated or divorced from output conveyor paths 120 and may still retain the efficiencies and improvements described. For example, a pick zone input path may be separate from the input conveyor path and the output conveyor path 120. For example, the input conveyor path may merge with the output conveyor path for at least a portion of the circulation path. Because the pick zone input path (which may include an exit path 135, accumulation path 150, and/or fulfillment path 155 as will be described below) is separate from the output conveyor path 120, backlogs at the pick zone input path do not hinder movement of parcels along the output conveyor path, so merging of the input conveyor path with the output conveyor path may not be negatively affected by backlogs at any pick zones.

One or more parcel identification devices 125 can be used to positively identify a parcel before conveying the parcel along an exit path 135. For example, a parcel identification device can be positioned at or just before each switch 130, or may be a part or function of the switch 130, to determine whether the parcel is to be redirected at a given switch. The parcel identification device on the input conveyor path 110 can be used to identify the parcel as well as a status of the parcel. For example, the status of the parcel may include information such as fulfilled and unfulfilled items, how long the parcel has been in circulation, whether there are any flags or concerns regarding the parcel, etc. A parcel identification device can be used, as will be described below, to direct a parcel with a completed order to shipping, to direct a parcel with a problem (such as ordered item is unavailable, for example) to a resolution center, and so forth.

Parcels directed from the input conveyor path 110 along an exit path 135 using the input conveyor switch(es) 130 may be conveyed directly to a target pick zone 145. In one aspect, pick zones may include a fulfillment path or fulfillment area 155 for fulfilling unfulfilled orders, or rather for the totes to wait while humans pick items and place the items in the parcel. Once picking is completed, the parcel can be pushed, moved, or otherwise placed onto a different output path 120 for circulation to other pick zones, to a shipping zone, etc. In another aspect, the exit path may 135 feed directly into the output path 120 and a picker 170 may physically move the parcels off of the output path to a fulfillment area for picking, and then subsequently put the parcel back onto the output path.

In one example for reducing congestion when there is a high volume of orders being delivered to a pick zone, the pick zone 145 can include an accumulation path 150 near or proximal to the output conveyor path (such as above, for example) for accumulating parcels for fulfillment. The accumulation path may deliver parcels from the exit path 135 to the fulfillment area 155. The accumulation path can enable accumulation of unfulfilled parcels when the picker 170 is unable to pick items from inventory 165 fast enough to match the rate of incoming parcels. In existing systems, to minimize congestion for high volume order flows, pickers will often physically remove the parcels from the picking area and stack them on the floor. This stacking can lead to a great deal of extra time and effort in moving the parcels away from and then subsequently back into circulation, and can thus be costly for a warehouse and tiring for a picker. Providing an accumulation path can enable at least some accumulation to be stored on the circulation path without moving parcels on and off of the circulation path. It is noted that while the accumulation path is described as above the output conveyor path or overhead, the accumulation path may optionally be under the output conveyor path, to the side of the output conveyor path, or in any other suitable proximal position or orientation with respect to the picker and/or output conveyor path. An accumulation path may be provided at every pick zone or alternately may be selectively installed at pick zones determined to have a higher volume loads. Use of the accumulation path can reduce congestion because the backlog of parcels does not interfere with the flow of other parcels along the input or output conveyor paths or to other pick zones.

In some examples, the exit path 135 may also be used for accumulation of unfulfilled parcels when the accumulation path 150 is not sufficiently large to store the current backlog of parcels. This configuration may be useful in single-level embodiments where an individual exit path leads to a single pick zone 145. Embodiments with multiple levels or with an exit path for multiple pick zones may also use the exit path for accumulation, but such use may lead to blockage of parcels from accessing pick zones with no backlog. Thus, for example, in a multi-level embodiment where an elevator 140 or other device is used to move a parcel between levels from an exit path at a given level to a pick zone at another level, the exit path may not be used for excess accumulation of parcels for a particular pick zone. For example, in a three-level system with four pick zones per level fed by an individual exit path, use of the exit path for accumulation for an individual pick zone may hinder fulfillment at the other eleven pick zones fed by that exit path.

Where multiple pick zones 145 are fed by an individual exit path 135, the warehouse conveyor system can include a pick zone switch 160 for directing the parcels to a fulfillment area 155 or accumulation path 150 for each individual pick zone. For example, where four pick zones on a single level are fed by the exit path, the pick zone switch can direct individual parcels to a suitable pick zone's accumulation path for fulfillment. A parcel identification device can be located at or just before the pick zone switch to identify the parcel and the target pick zone for the parcel.

The warehouse conveyor system can include an accumulation sensor 152 at or near individual accumulation paths 150. The accumulation sensor can include one or more sensors to information such as a presence of unfulfilled parcels, the number of parcels on the accumulation path, the current rate at which parcels enter the fulfillment area from the accumulation path, an estimated remaining capacity of the accumulation path, whether the accumulation path is full, and so forth. A circulation module 645 (FIG. 6) associated with a processor used in the warehouse conveyor system can be configured to cause parcels on the input conveyor path to circulate when the presence of unfulfilled parcels is detected, or rather when the accumulation sensor indicates insufficient capacity for additional parcels. The parcels can continue to circulate until there is sufficient capacity on the accumulation path for delivery to the accumulation path. Because the input conveyor path 110 (and output conveyor path 120 where merged) is separate from the pick zone input path, the flow of parcels is continuous and uninterrupted, and parcels can be quickly recirculated back to the appropriate input conveyor switch 130 for delivery to the target pick zone 145.

As has been mentioned, the warehouse conveyor system may be implemented across multiple levels to maximize use of space within a limited building footprint. Vertical lifts 140, such as elevators for example, can be used to transport parcels between levels. Various elevators exist for use in warehouse conveyor systems. Any suitable elevator may be used to fit a particular application. For example, gravity- or electrically/mechanically-operated elevators may be used convey parcels between levels. In one example, the elevators may be operable in two directions (i.e., up and down), and may be operable at a high speed to move a high volume of parcels between levels in a short time. In some examples, the elevators may include an elevator switch for directing a parcel in one direction or another once the elevator conveys the parcel to the destination level. In some examples the elevator switch and the pick zone switch 160 may be the same. In other examples, the warehouse conveyor system may include an elevator switch and a subsequent pick zone switch for finer granularity of switching. In one aspect, the vertical lift is positioned between the input conveyor switch and the pick zone for vertically conveying the parcel between a first elevation of the input conveyor path 110 and a second elevation of the output conveyor path 120 and/or of the pick zone 145.

The warehouse conveyor system can include an output conveyor path 120 for conveying the parcel from the pick zone 145 after fulfillment, as has been described. The output conveyor path can be physically separate from a pick zone path and/or from the input conveyor path 110. The output conveyor path can be used to convey parcels from the pick zone back to the input conveyor path, to a shipping zone 175, or to any other suitable destination. For example, the output conveyor path may lead to an output conveyor path switch 115 for diverting parcels from the output conveyor path to the input conveyor path or to the shipping zone. The output conveyor path can be configured to quickly convey parcels between the pick zones and the output conveyor switch. During this time, identification of the parcels, sorting of the parcels, and so forth may be unnecessary, and thus the output conveyor path can operate rapidly. A rate at which the input conveyor path operates may be limited according to the rate at which parcel identification devices can accurately and reliably identify parcels, according to the rate at which the input conveyor switch can switch parcels from the input conveyor path to an exit, or according to rate at which pickers are able to pick items to fulfill orders. However, the output conveyor path may not have these limitations and thus may operate at a faster rate than the input conveyor path or any other conveyor paths in the warehouse conveyor system. For example, the output conveyor path may operate at a speed at least double or twice the speed of operation of the input conveyor path. In some examples, the ratio of the speed of the output conveyor path to the speed of the input conveyor path may be approximately 0.5:1, 1:1:, 1.5:1, 2:1, 2.5:1, or 3:1 or greater.

Figure 1B:
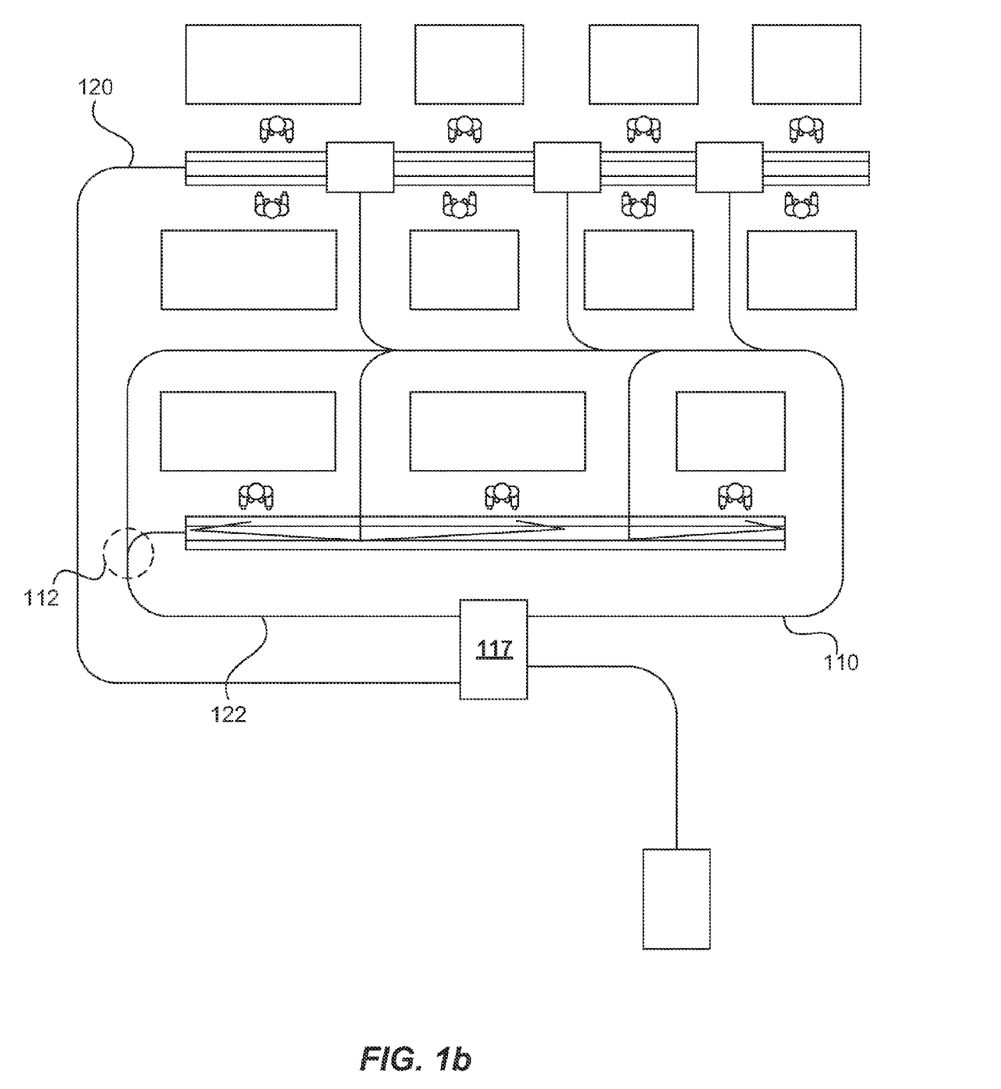

Referring to FIG. 1b, a warehouse conveyor system is illustrated which is similar in many regards to the system of FIG. 1a. The warehouse conveyor system of FIG. 1b illustrates an example where the input conveyor path 110 and the output conveyor path 120 are merged at 112 into a merged output path 122 until the output conveyor switch 117 is reached. FIG. 1b further illustrates an example with additional pick zones and pickers for the direct to zone parcel delivery model. The pick zones, item storage locations, pickers, and other features of the system may be varied in number, arrangement, and so forth for specific applications as may be appreciated.

Figure 2:
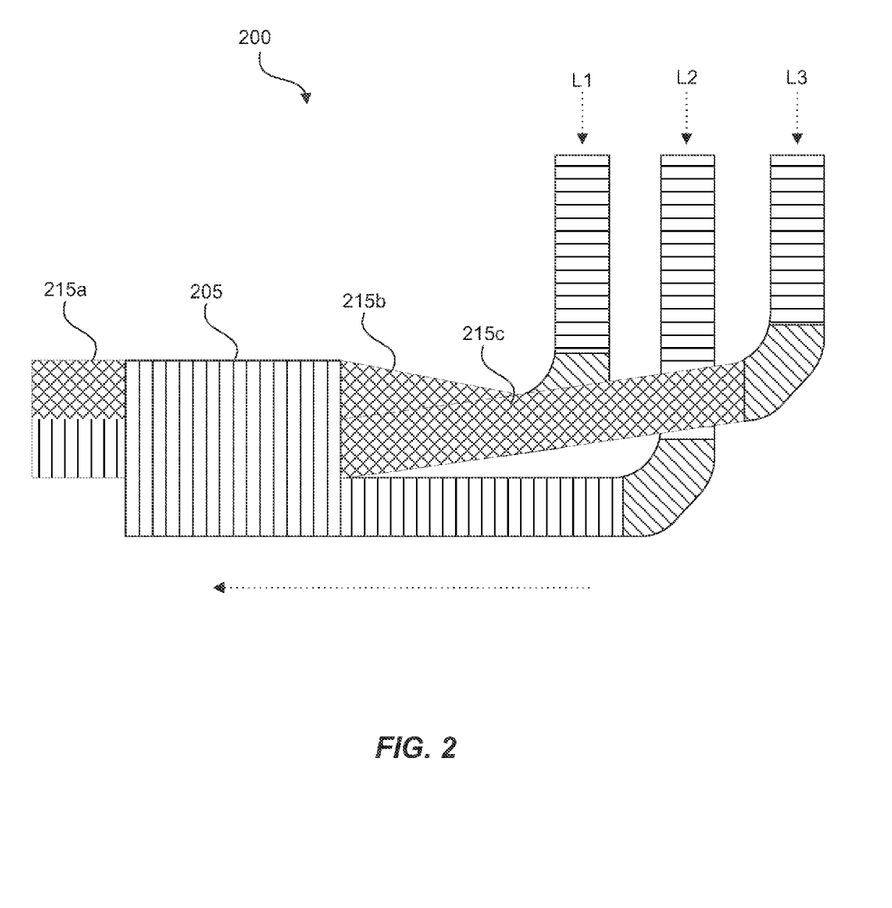
FIG. 2 is a top perspective view of a 3:2 conveyor switch for use in a warehouse conveyor system in accordance with an example of the present technology.

FIG. 2 is a top perspective view of a switch 200 for use in accordance with an example. The illustrated switch may be used for switching parcels from three different vertical levels L1-L3. The cross-hatched sections 215a-c indicate a path with a change in elevation, either up or down. The switch 205 in this example accepts parcels from the three different levels and can switch the parcels between one of two different paths. Switches in a variety of different configurations may be alternately be used. For example, the number of inputs and outputs to the switches, and the number of levels from which the switch receives parcels or to which the switch feeds parcels, or the number and orientation of directions from which the switch receives and or outputs parcels may vary from application to application.

Figure 3:
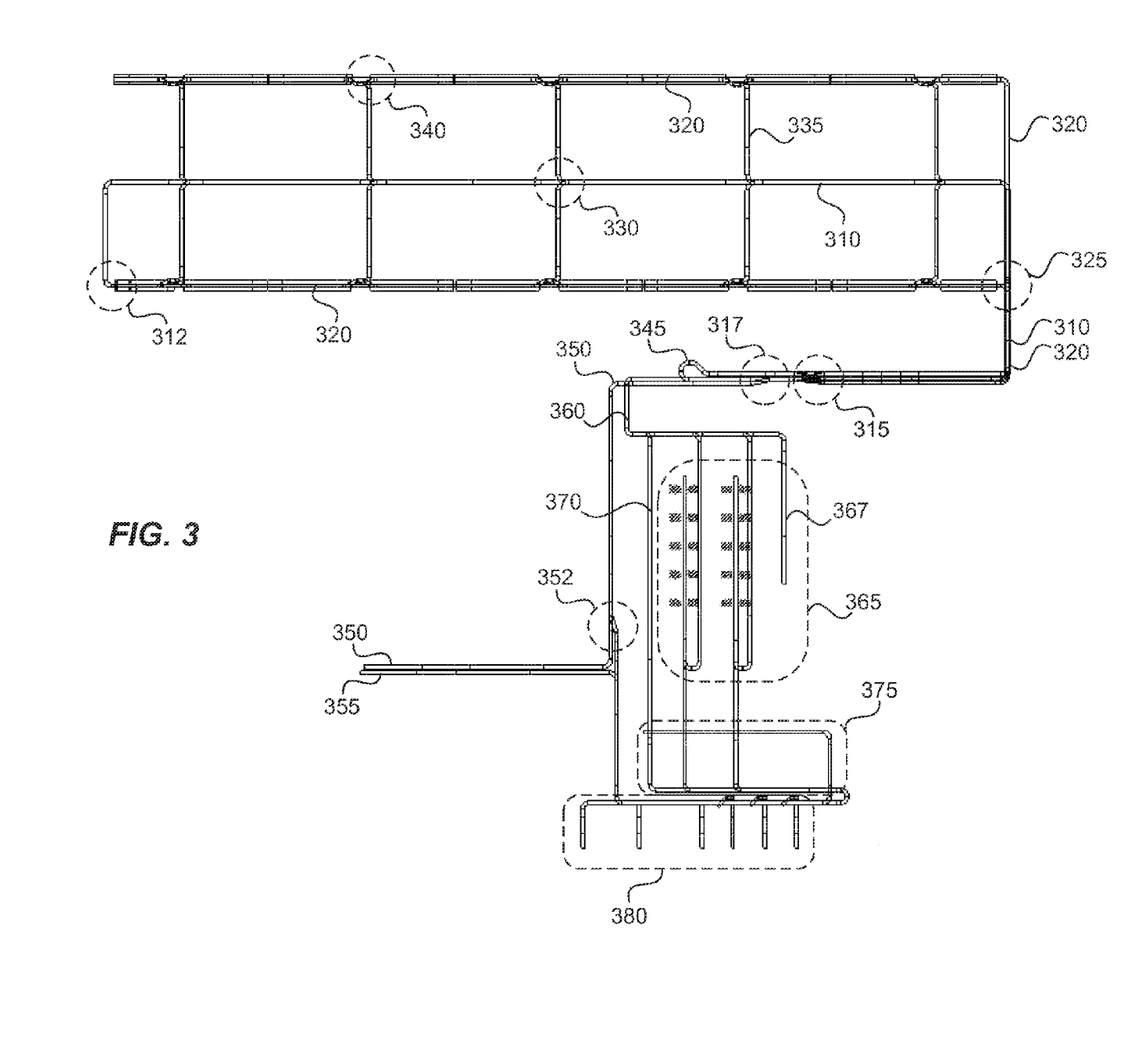
FIG. 3 is a top view of another warehouse conveyor system in accordance with an example of the present technology.

Referring to FIG. 3, a top view of a larger warehouse conveyor system is illustrated in accordance with an example of the present technology. The system includes many of the features of the systems described in regards to FIGS. 1a-2. A flow of parcels through the system will be described.

A parcel may enter the system on an empty/replenishment tote inbound path 350. The inbound path proceeds past an inbound merge 317 and switches onto the input conveyor path 310. The input conveyor path may convey the parcels between opposing rows of pick zones. Input conveyor switches 330 can sort the parcels and direct the parcels to an appropriate pick zone using the exit paths 335, vertical lifts 340, and so forth as have been described. In this example, the input conveyor path merges 312 with one of the vertically stacked output conveyor paths 320 through the pick zones. The input conveyor path passing between the opposing rows of pick zones operates in a direction substantially the opposite as that of the output conveyor paths from the pick zones. The number of output conveyor paths (i.e., six, assuming a three level system) in this example far exceeds the number of input conveyor paths (i.e., one). Parcels transported along multiple different output paths on a same level can be merged by a "traffic cop" device 325 onto a single output path for that level. The output conveyor switch 315 can merge the output paths on different levels onto a same level for switching to the input conveyor path 310 or to a shipping zone path 360. In this example, when parcels are switched to the input conveyor path, the parcels are directed around a loop 345 or roundabout to reverse a direction of flow. These parcels are merged with incoming parcels on the empty and replenishment tote inbound path 350 using the switch 317 and conveyed among the pick zones for further processing. It is noted that for a majority of the process, a direction of travel of the input conveyor path is different than and typically opposite of the direction of travel of the output conveyor path.

When all of the items for an order have been picked, the parcel may be switched toward the shipping zone path 360. The shipping zone can include an order packing area 365 where the items are packed into cardboard boxes or other suitable shipping containers. Taping and void filling stations 375 may be positioned along the path past the order packing area to fill voids in the shipping containers with foam, air-filled packaging, packing peanuts, etc. and to tape or otherwise seal the shipping containers for transport. In some examples, an order may require additional attention for packing or other purposes and may enter a special lane 367 for addressing these unique issues.

Orders that have been packed, taped, filled, and otherwise had processing completed can be directed to shipping lanes 380 where pallets, trucks, or other conveyance devices are available to transport the orders.

An excess number of empty parcels may be sent into the system from time to time. The present technology includes a configuration for removing or recycling the empty parcels. For example, empty parcels can be switched back onto the input conveyor path 310 using the roundabout 345 and fewer parcels can be sent inbound on the empty and replenishment tote inbound path. Alternately, empty parcels may be switched toward the shipping zone path 360 using switch 315 and directed past the order packing area 365 along an empty tote shipping zone path 370. The empty tote shipping zone path may or may not combine with taped and void filled orders toward the shipping lanes 380. The empty tote shipping zone path can direct empty parcels to merge with the empty and replenishment tote inbound path 350 at 352 or may direct the parcels along an empty tote outbound path 355 to respectively recirculate the parcels through the system or to remove the empty parcels from the system.

Figure 4A:
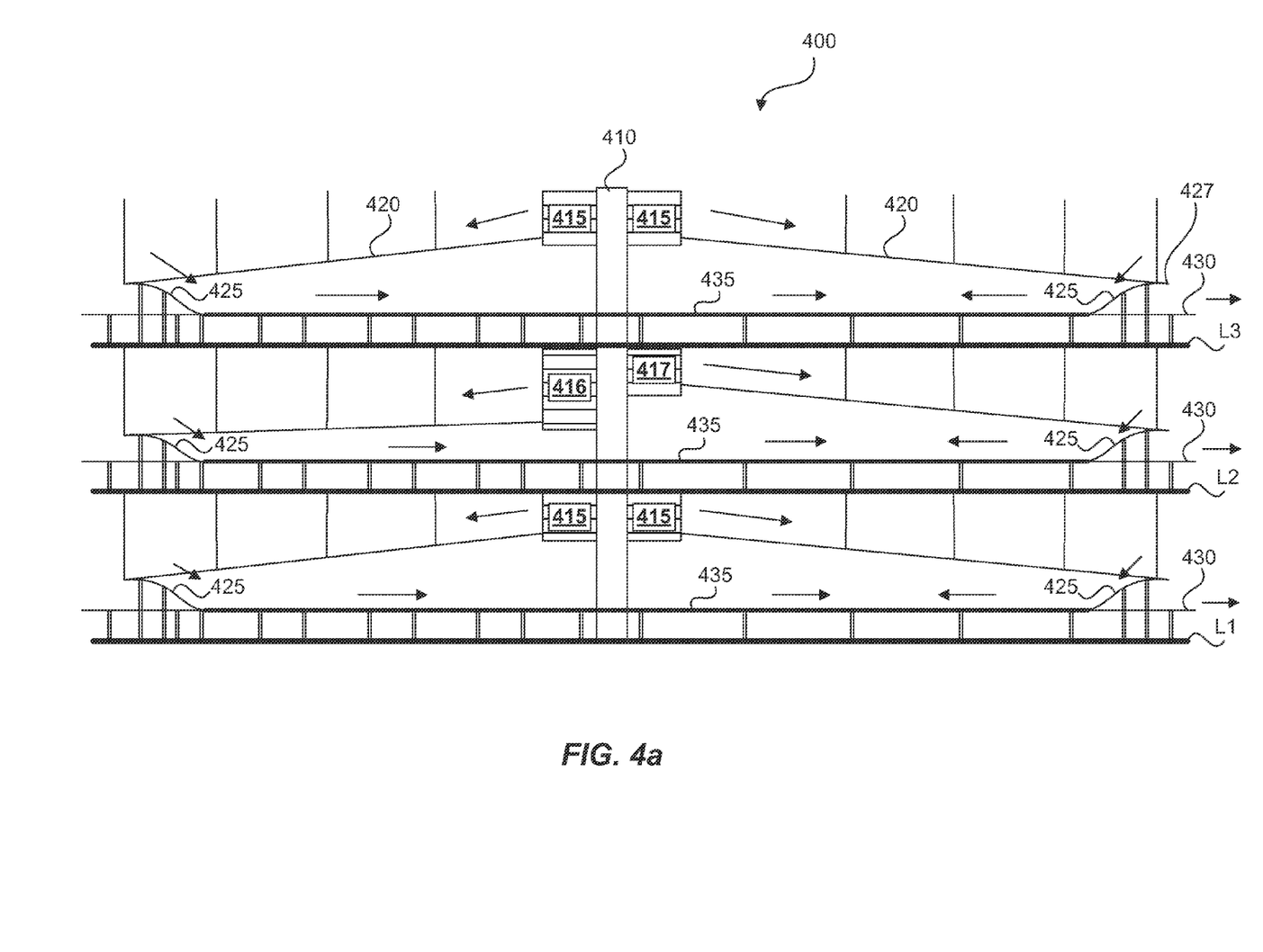
FIGS. 4a-4b are side views of pick modules for use in multi-level warehouse conveyor systems in accordance with examples of the present technology.

Referring to FIG. 4a, a side view of pick zones in a pick module 400 for use in a multi-level conveyor system is illustrated in accordance with an example of the present technology. In the center of the illustration is a vertical lift 410 for moving items between multiple levels L1-L3 of the system. An output 415-417 is located on each level adjacent to the vertical lift on multiple sides of the vertical lift. The output can include a cage or other structure to capture the parcels exiting the vertical lift. Optionally, depending upon the configuration of the system, a powered curve may be provided at the output to direct the parcels from the output around a motor-driven curving conveyor path to the accumulation path. In one example, the accumulation path may be supported by or hung from structure above the accumulation path, such as the bottom of a deck (identified at L1-L3) for the next level up. Output conveyor paths 430 run from one side to the opposite side in a single direction, which may be the same as or different from a direction of travel of parcels on the accumulation paths 420, depending on which side of the vertical lift the parcels exit.

A ramp 425 can optionally span between the accumulation path 420 and the fulfillment area 435, which in this illustrate is adjacent to and at a same elevation as the output conveyor paths 430. Optionally, a switch 427 may be provided at the lower end of the accumulation path, which is a distal end of the accumulation path from the vertical lift, to direct parcels to one of multiple ramps on either side of the output conveyor path, where pickers and fulfillment areas are positioned on either side of the output conveyor path.

The output at each of the levels may differ between levels. For example, the middle or second level of the system in FIG. 4a may include one output 416 that is taller or larger than the outputs 415 on the lowest or first level or the highest or third level. Similarly, the middle or second level of the system includes one output 417 that is shorter or smaller than the outputs 415 on the lowest or first level or the highest or third level. In one example, the different sizes of outputs may be used for differently sized parcels—for example, larger parcels may be sent to pick zones where larger items are to be picked and vice versa.

Some example dimensions for this system are as follows. A height or distance between the decks L1-L3 may be approximately 10'6", and accordingly a height between the deck for the first level and the deck for the third level is approximately 21' (or 2×10'6"). A height from the deck to the outputs 415 on the first and third levels may be approximately 7'10". A height from the deck to the taller output 416 on the second level may be approximately 5'4". A height from the deck to the shorter output 417 on the second level may be approximately 8'1". A height of the fulfillment areas 435 and output conveyor path 430 supported by the deck and as measured from the supporting deck may be respectively approximately 2'4" and 2'2" inches. The height from the deck at which the high end of the ramp 425 to the fulfillment area begins may be approximately 4'4". The accumulation path 420 may include 1.38" diameter gravity rollers on 3" centers. The fulfillment area may include 1.9" diameter rollers on 6" centers. The output conveyor path may include powered takeaway 1.9" diameter rollers on 3" centers.

Figure 4B:
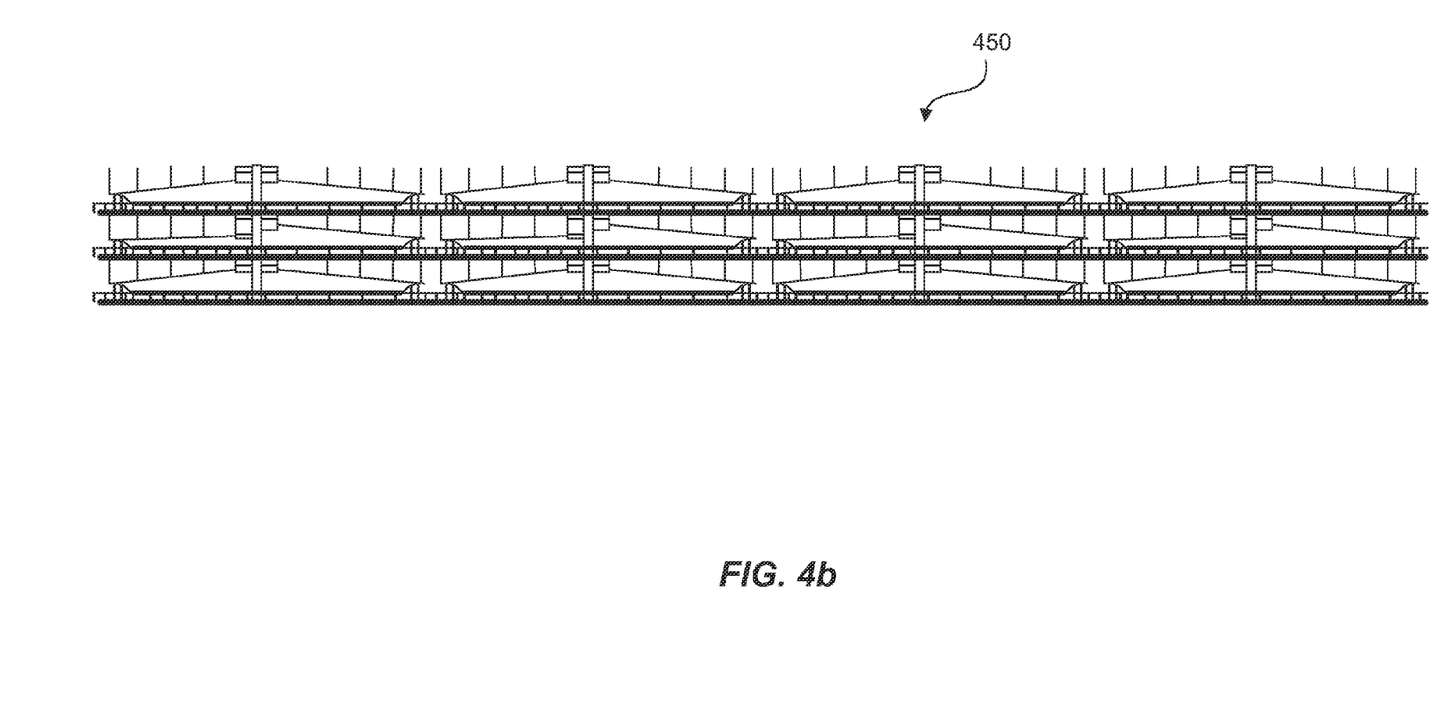

Referring to FIG. 4b, a side view of pick zones in a pick module 450 for use in a multi-level conveyor system is illustrated in accordance with the configuration shown in FIG. 4a where the pattern is repeated multiple times for a larger scale operation. Exit paths from the input conveyor path may lead to each of the illustrated vertical lifts. The pick zones on a given level of the system and are linearly arranged as shown may share a same or common, continuous output conveyor path.

Figure 5:
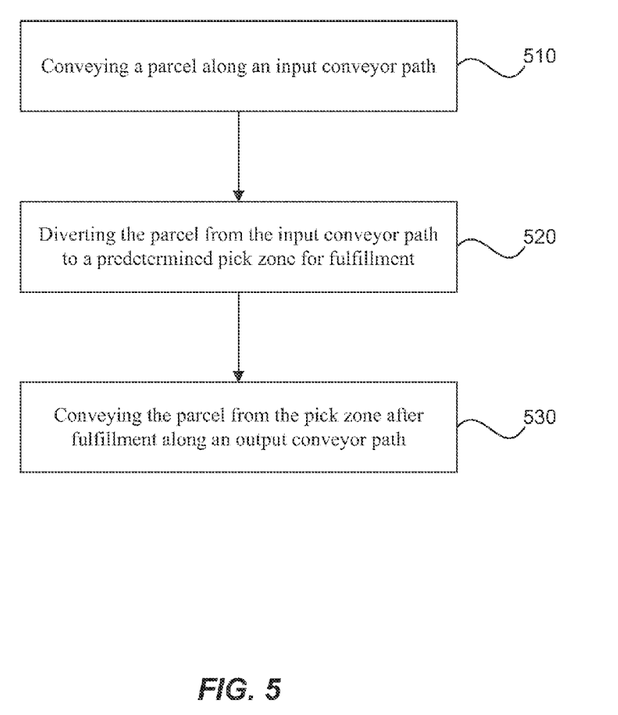
FIG. 5 is a flow diagram of a method for warehouse fulfillment in accordance with an example of the present technology.

Referring to FIG. 5, a flow diagram of a warehouse fulfillment method is illustrated in accordance with an example of the present technology. The warehouse fulfillment method can include conveying 510 a parcel along an input conveyor path and diverting 520 the parcel from the input conveyor path to a predetermined pick zone for fulfillment. The parcel can be conveyed 530 from the pick zone after fulfillment along an output conveyor path. A parcel and/or a status of the parcel can be identified at a predetermined location on the input conveyor path, and a determination can be made as to which one of a plurality of input conveyor path switches to use to divert the parcel from the input conveyor path for fulfillment. Depending on the configuration of the system and whether the system includes vertical lifts, the method may include vertically conveying the parcel between the input conveyor path at a first elevation and the output conveyor path at a second elevation. The method can include accumulating parcels for fulfillment on an accumulation path above the output conveyor path. For example, the method may include detecting a presence of unfulfilled parcels at the predetermined pick zone using an accumulation sensor and circulating the parcel on the continuous path when the presence of a threshold number of unfulfilled parcels is detected.

The method can include identifying a fulfillment status of the parcel and diverting the parcel from the output conveyor path to the input conveyor path or to a shipping zone using an output conveyor path switch depending on the fulfillment status.

In one example, the pick zones may be arranged in a spatial physical order defined by a physical location of the pick zones, and the step of diverting the parcel from the input conveyor path directly to the predetermined pick zone for fulfillment may include diverting the parcel to multiple of the plurality of pick zones in an order different than the spatial physical order. The present technology can maximize efficiency by conveying parcels directly to target pick zones and by planning a routing path through the system based on locations and destinations of other parcels within the system to minimize congestion at any particular pick zone by routing the parcels to physically non-sequential or non-adjacent pick zones.

In one aspect, the processing of an order may begin at a pick zone where an empty parcel is delivered using the input conveyor path. Order information is received at the pick zone by the picker rather than being pre-associated with the empty parcel. When at least a portion of the order is fulfilled at the starting pick zone, the parcel can be conveyed to the shipping zone if the order is complete or can be circulated to other pick zones as has been described to complete the order.

Portions of the systems and method described herein may be implemented as computer readable program code executed by the processor, the computer readable code being embodied on a non-transitory computer usable medium.

For example, the computer readable code may operate as a warehouse control system (WCS) to direct real-time activities within a warehouse or distribution center. The WCS can operate to maximize efficiency of the material handling subsystems or even activities of the warehouse employees. Some examples of material handling subsystems can include devices such as carousels, conveyor systems, sorters, palletizers, vertical lifts, "traffic cops", switches, and so forth. The WCS can interface to an upper level host system/Warehouse management system (WMS) and exchange information regarding management of the daily operations of the distribution center. The WMS can manage business aspects of the system such as receiving customer orders, allocating inventory, and generating shipping manifests or bills of lading and invoices based on order fulfillment information and shipping information received from the WCS. The WCS can allocate work to the various material handling sub-systems to balance system activity to complete the requested workload. The WCS can providing real-time directives to operators and material handling equipment controllers to accomplish order fulfillment. The WCS can provide a graphical user interface (GUI) for use in controlling or managing the WCS and other warehouse systems by a human operator. The WCS can also collect statistical data on the operational performance of the system.

At each decision point the WCS may determine an efficient routing of the parcel and transmit directives to the equipment controllers to achieve the desired result. Equipment controllers may be at a lowest level of the system. The equipment controllers may include, for example, a Programmable Logic Controller (PLC) or a dedicated, real-time PC control system. The equipment controllers may interface to peripheral Input/Output (I/O) devices such as photo-eyes scanners, motors, etc. as well as data collection devices such as bar code scanners (barcode reader) and weigh scales and may be responsible for the physical operation of the material handling equipment. The equipment controllers may also be responsible for the physical handling of product and tracking it from point-to-point based on the direction from the upper level control systems.

Figure 6:
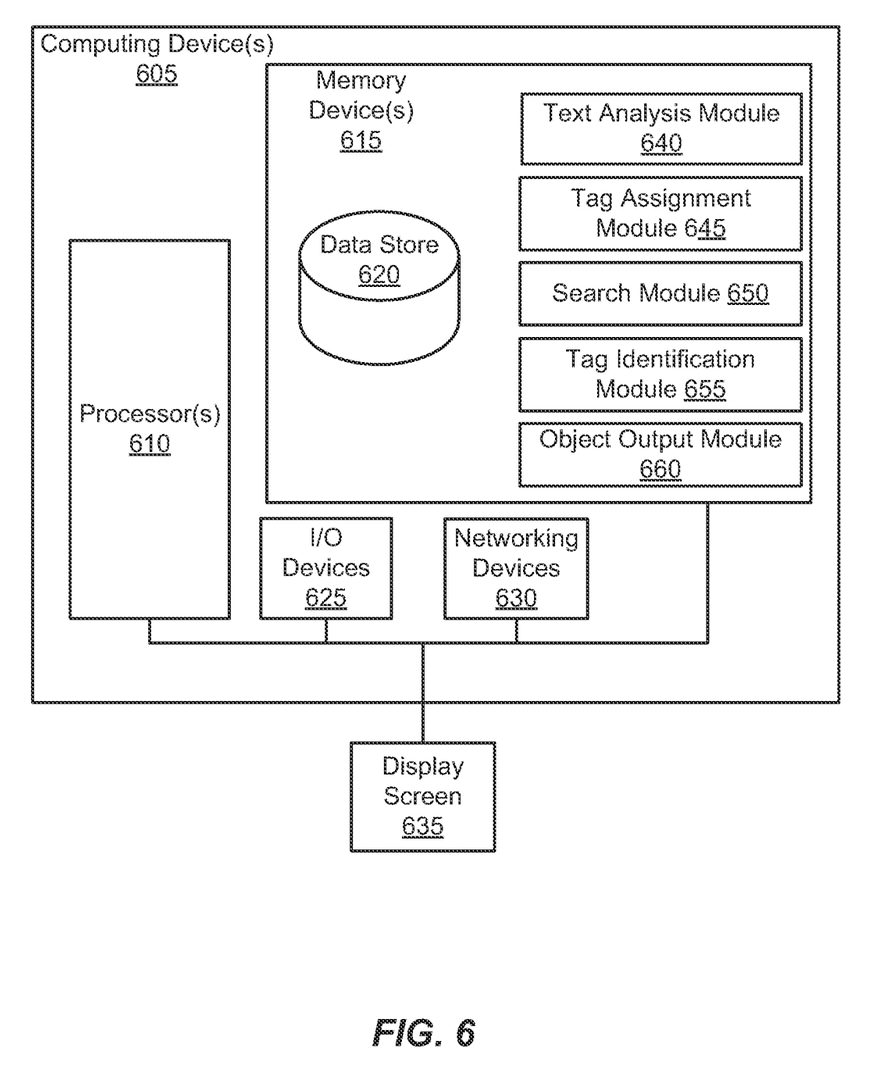
FIG. 6 is a block diagram of a system for warehouse management in accordance with an example of the present technology.

Referring to FIG. 6, a warehouse management system is shown in accordance with an example of the present technology. FIG. 6 illustrates that a device 605 may be a computing device or computing node that includes hardware processor devices 610, hardware memory devices 615 and Input/Output (I/O) device 620 communication to enable communication between hardware devices and I/O components. Networking devices 625 may also be provided for communication across a network with other nodes of the technology. The network device may provide wired or wireless networking access for the networkable devices. Examples of wireless access may include cell phone network access, Wi-Fi access or similar data network access.

FIG. 6 also illustrates a computing device 605 on which modules 640, 645, 650 of the present technology may execute. The computing device may include one or more processors 610 that are in communication with the memory devices 615. The computing device may include a local communication interface for the components in the computing device. For example, the local communication interface may be a local data bus and/or any related address or control busses as may be desired.

The memory device 615 may contain modules that are executable by the processor(s) 610 and data for the modules. Located in the memory device are modules executable by the processor. For example, a parcel identification module 640 for identifying the parcels, a circulation module 645 for triggering switches and the like or otherwise routing the parcel based on the identification of the parcel or status of the parcel, an accumulation module 650 configured to monitor the accumulation of parcels on the accumulation paths, and other modules may be located in the memory device. The modules may execute the functions described earlier. A data store 635 for storing orders, warehouse inventory and other data may also be located in the memory device for storing data related to the modules and other applications along with an operating system that is executable by the processor(s).

Other applications may also be stored in the memory device 615 and may be executable by the processor(s) 610. Components or modules discussed in this description that may be implemented in the form of software using high programming level languages that are compiled, interpreted or executed using a hybrid of the methods.

The computing device may also have access to I/O (input/output) devices 620 that are usable by the computing devices. An example of an I/O device is a display screen 630 that is available to display output from the computing devices 605. Other known I/O device may be used with the computing device as desired. The networking devices may be wired or wireless networking devices that connect to the internet, a LAN, WAN or other computing network.

The components or modules that are shown as being stored in the memory device 615 may be executed by the processor 610. The term "executable" may mean a program file that is in a form that may be executed by a processor. For example, a program in a higher level language may be compiled into machine code in a format that may be loaded into a random access portion of the memory device and executed by the processor, or source code may be loaded by another executable program and interpreted to generate instructions in a random access portion of the memory to be executed by a processor. The executable program may be stored in any portion or component of the memory device. For example, the memory device may be random access memory (RAM), read only memory (ROM), flash memory, a solid state drive, memory card, a hard drive, optical disk, floppy disk, magnetic tape or any other memory components.

The processor 610 may represent multiple processors and the memory 615 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer and similar systems.

EXAMPLES

A detailed example of the above technology may be used to explain the mechanical design and equipment of a warehouse conveyor system such as that described above. The order processing and/or daily shipping capacity can be up to tens of thousands of orders per day to determine the viability of the system in meeting high expected order volume.

Totes may be created as single line item totes or multi-line item totes. The type of tote is determined by "item count". If the item count is '1' then the tote can be a single line item tote. If the "item count" is greater than one '1' then the tote can be assigned as a multi-line tote.

Single line totes contain multiple orders with only a single line item per order. As assumption was made, based on observational data that picking each line item for single line totes it involves less time than for multi-line totes. Therefore, the example used specific time estimates for operator pick times for single line totes. Also, single line totes have lines picked from a single pick zone and, therefore, are not re-routed between pick zones within the pick module. Once all lines/orders have been picked at the pick zone of origin, the totes are pushed onto the main line conveyor and conveyed to the pack area where the orders are individually packaged and shipped.

Multi-line totes contain a single order but consist of more than one line item to be picked. A specific time element was created for operators to pick each line in a multi-line order. Multiline totes are routed to multiple pick zones via the conveyor and lift system until all line items are picked for the order. Once all line items have been picked the parcels are sent to the packaging area where the order is consolidated into a single box.

As mentioned previously, single line orders have multiple orders that each have one line item. The assumption is that the orders were consolidated into one single tote because the line items came from one single pick zone. On the other hand, multi-line orders have more than one line and each can be picked from any of the 120 different pick zones in the example. The example assumes that all lines are randomly assigned a single pick zone with all 120 zones having the same probability of being selected. The single line totes will receive one assigned pick zone where all the orders will be picked from that zone. Multi-line orders will be scattered across the entire pick module. For example, a multi-line order that has 10 different lines may have pick zones assignments of zones 33, 54, 91, 2, 17, 39, 63, 21, 54, and 111. Two separate lines were assigned zone 54. In this example the tote would be routed to 9 different pick zones in order to fill the entire order, two lines would be picked from zone 54 and a single line item from each of the other assigned pick zones. The example randomizes the specific sequence of pick zones and does not consider crushability, stackability, or any specific picking requirements that are SKU (stock-keeping unit) dependent. Each tote order was dropped at the assigned first zone pick. When ready to pick the order, an operator selects a tote from the empty tote inventory, puts the tote on the pick conveyor, makes the picks, and pushes the tote onto the main line to be routed to the tote's next destination.

For simplicity in operator scheduling, this example assumes that there are 60 picking operators available for all 24 hours of the day. Each operator may be assigned two pick zones. Basic time elements were used to estimate an operators travel time from zone to zone. Operator walking speed was modeled at 300 feet per minute, which is considered a reasonable walking speed, with an average distance between zones at 40 feet. There are two types of order pick requests at each station: 1) new orders and 2) existing tote orders. New orders are those orders that have just been dropped to the system and are ready for the first pick. Existing orders are those that have already had picks made and are being routed throughout the pick module for additional picks. Existing orders accumulate on the overhead conveyor which feeds the pick zone. Each operator moves between assigned work zones, picking totes as they become available. For new orders, an operator grabs an empty tote from the empty tote inventory, scans the tote, and makes the required number of picks to the tote. If an empty tote is not available in the operators' current zone, he/she travels to an adjacent zone to retrieve one. The example accounts for the extended walk in finding an empty tote. For existing orders, the operator pulls up to ten totes from the overhead conveyor to the pick station, picking each one individually. Since each overhead conveyor is shared by two pick zones the operator will push totes destined for the opposite pick zone to that side of the gravity feed conveyor where to operator assigned to that zone will pick those totes, once he/she is available. After picks are made, the operator pushes the tote onto the main take-away conveyor where the totes are routed to their next destination. When an operator is done making the necessary picks in each of the assigned totes within a zone he/she will walk to the next zone.

After being picked, single line totes are routed on the main conveyor line, to a 3-to-1 switch, and to the shipping area. The example attempts to send all single line orders to the envelop packing station, if the envelop packing station is not too busy. If there are more than 20 totes at the envelop station then single line totes are sent to one of the two shipping pods for packaging. Multi-line orders are routed throughout the picking module until the picks have been completed.

After the initial pick the totes are conveyed to the end of the primary take-away conveyor where totes merge onto the main line. The main line conveyor routes the totes to the 3-to-1 switch. After the switch, totes are routed through the inbound merge and to the sorter. The sorter then diverts the totes to the appropriate lift. If the assigned lift is backed up (all accumulation capacity is occupied) then the tote is re-circulated through the 2nd floor mezzanine pick conveyor, through to the 3:1 merge, through inbound merge, and to the sorter. A mechanical vertical lift is used to transport the tote to the appropriate level of the pick module. The totes are then accumulated on the overhead accumulation conveyor, where the tote is inserted into the pick zones work queue. When completed, all multi-line totes are sent to the pack stations. Computer logic selects a shipping pod as a round-robin basis, alternating assignments to evenly spread the work across both pods. Totes are accumulated on the shipping conveyor until a packing operator pulls the tote from the conveyor and packages all orders inside, for shipping.

Again, in an effort to properly test the mechanical design, the human element was maximized to prevent labor from being a system constraint. Therefore, this example assumes that the packaging area was richly staffed with 24 packaging operators in each packaging pod (48 total operators). Each operator pulls a tote from the overhead accumulation conveyor at each packaging pod. For single line orders, the operator individually packages each order in the tote. The example assumes that 65% of all orders can be packaged in a single envelop and returned to the original tote which is used as a conveyance vehicle to the shipping dock. The other 35% of single line orders are packaged into individual shipping boxes and sent to the taping stations. The example also assumes that all multi-line orders are packaged into a single box. Essentially one shipping box is created for each multi-line order tote. After the tote has been packaged, both the boxes and empty tote are placed on the conveyor line and conveyed to the taping station.

Packaged orders are filled with void fill material and pushed through a taping machine. The example assumes that each box takes about 2.5 seconds for void filling. The example used has two physical void fill and taping stations but assumes a faster than normal rate that represents three to four taping stations. An anecdotal observation from the example suggest that on peak days, two void fill/taping stations are insufficient to meet high volume demands. Taping operators collect all empty totes coming to the station and place them on the empty tote return conveyor where they are routed back to the dock, or returned to the pick example based on empty tote demand. The example assumes that an operator expends a minimum of 2.0 seconds to grab an empty tote and place it on the overhead conveyor. All sealed boxes are then routed to one of the six shipping lines. The totes are diverted into a truck where the example assumes an operator promptly removes the box and stacks it in the truck; therefore, the shipping dock accumulation capacity was not evaluated. This could be a concern for high volume days if operators are not efficiently removing boxes from the shipping spurs and placing them into trucks. The example did not analyze the capacity of shipping vehicles or the scheduling or movement of vehicles to and from the shipping dock.

The example initiates each pick zone with 60 empty totes (120×60=7200 total). Replenishments are dynamically requested once the inventory level in the pick zone drops below 50 totes. Therefore, empty totes coming from the taping stations are routed to pick zones that have made empty tote requests. If there are no outstanding empty tote requests then empty totes are sent to the empty tote collection area, on the dock. The example does not pull any empty totes from the dock to fill inventory needs. The example also does not actively track actual empty tote availability based on a finite number of totes in the system. Essentially the assumption is that empty totes availability will not constrain activity in the system and, therefore, are considered a limitless resource, with the exception to the number of available totes in the pick module and the burden that replenishment has on the system. Once empty tote replenishments arrive on the overhead conveyor in the destined pick zone an assumption is made that an operator will pull empty totes down from the conveyor and stack the empty totes in the pick zone empty tote inventory. The example further assumes that the amount of time to pull empty totes from the conveyor is negligible.

One example implementation includes inventory replenishment activities. In this example, replenishment totes are inducted on the inbound conveyor at a defined rate of approximately 1000 totes per hour. Replenishment totes fulfill two purposes in the example. The replenishment totes provide a means to test the system to determine capacity and utilization of key mechanical elements while performing both shipping and receiving activities. The replenishment totes are also used to replenish empty tote inventory at the pick zone. Replenishment totes are inducted into the system, routed to the 2:1 inbound merge, and sent to the sorter where the totes are diverted to the appropriate lift. The tote lift delivers the replenishment tote to the proper pick zone conveyor where the replenishment tote is inducted into the pick zones work queue. The example assumes that the pick operator's only interaction with the replenishment tote is to pull the tote from the conveyor and set the tote on the floor. The example further assumes that another operator, not included in the example, will pull inventory from the tote and stack the empty tote under the conveyor for available tote inventory within two minutes of being pulled from the overhead conveyor. Again, the purpose of this activity in the example was to evaluate the capacity of mechanical equipment and system design and not to analyze operator work schedules and volumes.

The conveyor system, including speeds and controls were formed to include three primary merges which include a 3:1 switch, the 2:1 inbound merge, and the "Traffic Cop" merges. The following discussion will outline the operational assumptions associated with mechanical elements in the system design.

The conveyor system was formed with various speeds throughout the system ranging from 90 fpm (feet per minute) to 300 fpm. Table 1 below provides a brief outline of various conveyor segments and lists the speed for those sections.

TABLE 1

| Conveyor Area | Defined Speed | Notes |
| --- | --- | --- |
| Pick Zone Roller Conveyor | Walk Speed (300 fpm) | ** Assumed that operators will pull/push totes at a walking speed. Actual speed is negligible in the statistical outcome |

TABLE 1-continued

| Conveyor Area | Defined Speed | Notes |
|---|---|---|
| Overhead Accumulation Conveyor To Pick Zone | 120 fpm | ** All conveyor sections after the tote leaves the lift |
| Accumulation Conveyor Prior to Tote Lifts | 120 fpm | ** incudes sections post sorter |
| Pick Module Sorter Conveyor | 300 fpm | |
| All sections after 2:1 inbound merge feeding Sorter | 210 fpm | |
| Inbound 2:1 merge | 240 fpm | |
| All sections after 3:1 switch feeding 2:1 inbound merge | 240 fpm | |
| 3:1 Switch | 300 fpm | |
| 3 Sections on all levels feeding 3:1 Switch | 240 fpm | |
| 4th Section on all levels feeding 3:1 Switch | 180 fpm | |
| 5th Section on all levels feeding 3:1 Switch | 120 fpm | * Gradual acceleration from 120 to 180 to 240 before enter the switch |
| All other sections from the pick module to the switch | 120 fpm | ** Most sections are set at 120 fpm throughout the system, with exeption to the merges and switches as defined. |
| All sections after the 3:1 switch feeding the Packaging sorter | 120 fpm | |
| Packaging Sorter | 180 fpm | |
| All sections feeding the packaging are after the sorter | 90 fpm | |
| All sections post packaging prior to the shipping sorter | 90 fpm | |
| Shipping sorter | 180 fpm | |
| Shipping conveyors entering the trucks | 90 fpm | |
| All empty tote return sections of conveyor | 120 fpm | |
| All inbound segments of conveyor prior to the 2:1 inbound merge | 120 fpm | |

The conveyor switch was created to have a capacity of 5400+ totes per hour. The designed gap between the back of one tote and the front of the next was set to 8 inches and the section runs at a speed of 300 feet per minute.

The conveyor line from the 3:1 switch feeding the inbound merge is the primary line through the 2:1 merge and, in most cases, has right-of-way through the merge. All inbound totes, empty or replenishment, are conveyed to the inbound merge and have a lower priority for induction through the merge. As inbound totes are presented at the merge, the example attempts to zipper these totes into open gaps on the main line. The example accomplishes this by monitoring a photo eye positioned four feet prior to the merge, on the main line. If the photo eye has been clear for at least one second then the example releases a tote into the window and merges it onto the main line. In the event that the line backs up beyond the accumulation zone, the section on the main line conveyor is shut down and the inbound line is turned on for 10 seconds, releasing a slug of totes into the merge.

There were three "traffic cop" merges created, one on each level of the pick module. These merges were used to meter totes entering the main line from the left side of the pick module. The example opens gaps on the main line on an as-need basis to ensure that totes are equitably inducted onto the main line. If a line happens to back up and block a photo eye 25 feet back from the merge, the example closes the main line traffic and releases the backed up section for 10 seconds to allow the backed up line to drain.

There were 10 mechanical tote lifts included in the example. Each lift could achieve approximately 8 tote moves per minute with the manufacturer's suggested operational parameters. The example used a slightly more conservative approach.

Three example implementations were run to help identify the capacity of the system. Each example was run for 24 consecutive hours and based on the order release times provided from the actual order data. The examples include a 50,000 order day, a 40,000 order day, and a 30,000 order day with inventory replenishment. The two variables that were modified between the three examples were the order quantity and the replenishment of 80,000 items (10,000 totes). The order quantity was adjusted by modifying the order scaling factor. A value of 100% would essentially run the entire order profile consisting of slightly more than 50,000 orders for the day. An order scale factor of 80% would randomly strip out 20% of the orders from the original file and run the remaining 40,000 orders. An order scale of 60% would run approximately 30,000 orders. Also, some massaging of the order data was necessary to minimize the extreme hourly spikes in volume. Therefore, approximately 33% of the orders from hour 7 were shifted to hour 6, 4% of orders from hour 15 were shifted to hour 17, and 13% of orders from hour 16 were shifted to hour 17.

The 50,000 orders per day demonstrated some variation in hour-by-hour order activity. The example results implied that the mechanical equipment has the capacity to manger the variability in order volume for the three examples. The utilization statistics found suggest that the system at the conveyor and lift level has capacity to meet the 50,000 order per day demand.

The assumption for each example implementation was that each taping station could process each box in 2.5 seconds, which includes void fill and taping operations. Based on on-site observations, peak rates for the void fill activities, per operator, was about 4.5 seconds per box which translates into approximately 1600 boxes per hour for both stations. That capacity is affected with the assumptions that it takes about 2.0 seconds to grab the empty totes from the packaging stations and put them on the overhead conveyor. The example assumed that the operators could achieve a maximum of 2880 boxes per hour, handling both the boxes and empty totes. An additional experiment was run to replicate a 40,000 order day but with two tape stations operating at 4.5 seconds per box and 2.0 seconds per empty tote. The result showed that taping operation became a constraint and limited the capacity of the system. Therefore, increased taping station capacity is recommended for the present configuration when the daily order capacity reaches 40,000 orders. An initial estimate would be to add a 3rd station when shipping capacity reaches 40,000 orders per day and a 4th station when shipping capacity reaches 50,000 orders per day.

Two areas that were not addressed at a detailed level in the example effort were accurate staffing levels and tote quantity, tracking, and availability. The assumption in the example was that the system was richly staffed to avoid backup in the picking module, ensure sufficient resources at shipping to avoid backup into the switch, and virtually, not physically, four taping station to avoid significant backup into packaging.

In summary, the specific design illustrated in FIG. 3 and the other figures was able to manage up to 50,000 orders per day successfully. The present technology can be scaled for applications with larger or smaller volumes as will be apparent, without departing from the spirit and scope of the present technology.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium or computer readable storage device that includes volatile and non-volatile, removable and non-removable media implemented with any technology for the storage of information such as computer readable instructions, data structures, program modules, or other data. Computer readable storage media include, but is not limited to, RAM (Random-Access Memory), ROM (Read-Only Memory), EEPROM (Electrically Erasable Programmable Read-Only Memory), flash memory or other memory technology, CD-ROM (Compact Disc, Read-Only Memory), DVD (Digital Versatile Discs) or other optical storage, magnetic cassettes, magnetic tapes, magnetic disk storage or other magnetic storage devices or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. By way of example, and not limitation, communication media includes wired media such as a wired network or direct-wired connection, and wireless media such as acoustic, radio frequency, infrared and other wireless media. The term computer readable media as used herein includes communication media.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Reference has been made to the examples illustrated in the drawings, and specific language has been used herein to describe the same. It will nevertheless be understood that no limitation of the scope of the technology is thereby intended. Alterations and further modifications of the elements illustrated herein, and additional applications of the examples as illustrated herein, which would occur to one skilled in the relevant art and having possession of this disclosure are to be considered within the scope of the description.

With the general examples set forth herein, it is noted that when describing a system, or the related devices or methods, individual or separate descriptions are considered applicable to one other whether or not explicitly discussed in the context of a particular example or embodiment. Furthermore, various modifications and combinations may be derived from the present disclosure and illustrations, and as such, the figures should not be considered limiting.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A warehouse conveyor system, comprising:
an input conveyor path for conveying a parcel toward a pick zone, wherein the input conveyor path is part of a continuous path;
an input conveyor switch for diverting the parcel from the input conveyor path to a predetermined pick zone for fulfillment of an order;
an output conveyor path for conveying the parcel from the pick zone after fulfillment of the order;
an accumulation sensor to detect a presence of unfulfilled parcels; and
a circulation module configured to circulate the parcel on the continuous path when a threshold number of unfulfilled parcels is present at the pick zone.

2. The system of claim 1, further comprising a vertical lift between the input conveyor switch and the pick zone for vertically conveying the parcel between a first elevation of the input conveyor path and a second elevation of the output conveyor path.

3. The system of claim 1, further comprising an accumulation path in proximity to the pick zone for accumulating parcels for fulfillment of the order.

4. The system of claim 1, further comprising an output conveyor path switch for diverting parcels from the output conveyor path to the input conveyor path or to a shipping zone.

5. The system of claim 1, wherein the input conveyor switch comprises a plurality of input conveyor switches, the system further comprising a parcel identification device on the input conveyor path for identifying the parcel and a status of the parcel to determine one of the plurality of input conveyor switches to use to divert the parcel for fulfillment of the order.

6. The system of claim 1, wherein a speed of operation of the output conveyor path is higher than a speed of operation of the input conveyor path.

7. A warehouse fulfillment method, comprising:
conveying a parcel along an input conveyor path, wherein the input conveyor path is a continuous path;
diverting the parcel from the input conveyor path to a predetermined pick zone for fulfillment of an order;
conveying the parcel from the pick zone after fulfillment of the order along an output conveyor;
detecting a presence of unfulfilled parcels at the pick zone using an accumulation sensor; and
circulating the parcel on the continuous path when the presence of a threshold number of unfulfilled parcels is detected.

8. The method of claim 7, wherein the pick zone comprises a plurality of pick zones arranged in a spatial physical order, and wherein diverting the parcel from the input conveyor path directly to the predetermined pick zone for fulfillment of the order comprises diverting the parcel to multiple of the plurality of pick zones in an order different than the spatial physical order.

9. The method of claim 7, further comprising vertically conveying the parcel between the input conveyor path at a first elevation and the pick zone at a second elevation.

10. The method of claim 7, further comprising accumulating parcels for fulfillment of the order on an accumulation path above the output conveyor path.

11. The method of claim 7, further comprising identifying a fulfillment status of the parcel and diverting the parcel from the output conveyor path to the input conveyor path or to a shipping zone using an output conveyor path switch depending on the fulfillment status.

12. The method of claim 7, further comprising:
identifying the parcel and a status of the parcel;
determining one of a plurality of input conveyor path switches to use to divert the parcel from the input conveyor path for fulfillment of the order.

13. The method of claim 7, wherein the input conveyor path comprises an input conveyor belt and the output conveyor path comprises an output conveyor belt, the method comprising rotating the output conveyor belt at a faster rate than a rotation of the input conveyor belt.

14. A warehouse conveyor system, comprising:
an input conveyor path for conveying parcels;
a plurality of input conveyor path switches for diverting at least one of the parcels from the input conveyor path to a predetermined pick zone for fulfillment of an order;
a plurality of vertically layered output conveyor paths at a plurality of elevations for conveying the at least one of parcels from the pick zone after fulfillment of the order;
a vertical lift between each of the input conveyor path switches and the plurality of vertically layered output conveyor paths for vertically conveying the at least one of parcels between a first elevation of the input conveyor path and a second elevation of a selected one of the plurality of output conveyor paths; and
a sorting module configured to sort the parcels horizontally and vertically by causing the parcels to exit the input conveyor path using a selected one of the plurality of input conveyor path switches and to exit the vertical lift at a selected one of the plurality of elevations for delivery directly to the predetermined pick zone.

15. The system of claim 14, further comprising an accumulation path above the output conveyor path for accumulating parcels for fulfillment of the order.

16. The system of claim 14, further comprising an output conveyor path switch for diverting parcels from the pick conveyor path to the input conveyor path or to a shipping zone.

17. The system of claim 14, wherein the output conveyor paths convey the at least one of the parcels more quickly than the input conveyor path conveys the at least one of the parcels.

* * * * *